3,235,588
PURIFICATION OF BENZOIC ACID

Calvin W. Weaver, Sarnia, Ontario, Canada, assignor to The Dow Chemical Company, Midland, Mich., a corporation of Delaware
No Drawing. Filed Dec. 3, 1962, Ser. No. 242,869
8 Claims. (Cl. 260—525)

This invention relates to a method for purifying crude aromatic carboxylic acids obtained as the product of catalytic partial oxidation of an alkylated aromatic hydrocarbon. It relates particularly to the purification of benzoic acid made by such a process.

The general procedure whereby a lower alkylated benzene is partially oxidized by an oxygen-containing gas to the corresponding aromatic carboxylic acid and this crude acid is further reacted to make a phenol is now well known and is commercially applied. The oxidation of the aromatic hydrocarbon is commonly done in the presence of a metallic catalyst which includes cobalt as an active component. The product stream from such oxidation of toluene, for example, consists of benzoic acid, unreacted toluene, and catalyst, together with small amounts of by-products such as tars, hydrocarbons other than toluene, and various oxygenated compounds. After a preliminary purification to remove the bulk of the unoxidized toluene, catalyst residues, and oxidation by-products, a crude benzoic acid product is obtained which then may be used as the feed stock for a process for converting aromatic carboxylic acids to the corresponding phenols. I is frequently desirable to diversify the production of phenol plants using such a process by separating and further purifying a portion of the crude benzoic acid feed stream to a technical or higher grade of purity and selling it as such.

Conventional methods for purifying benzoic acid include distillation and sublimation. Recrystallization of the crude material from hot water is also a well established method for obtaining highly purified benzoic acid. However, the nature of the impurities contained in the particular crude benzoic acid obtained from the oxidation process described above makes these conventional methods of purification relatively ineffective. The impurities include, for example, benzaldehyde, benzyl alcohol, benzyl esters, and related compounds which have vapor pressures or solubilities close to those of the desired benzoic acid and are consequently difficult to remove from the product in substantial entirety by any of the known procedures.

It has now been found that portions of a crude benzoic acid produced by incomplete oxidation of toluene with molecular oxygen can be separated and benzoic acid of particularly high purity can be obtained by a partial extraction process wherein the molten crude benzoic acid is contacted with liquid water at a temperature between about 95° C. and about 117° C., the water-crude benzoic acid proportion being such that two liquid aqueous benzoic acid phases coexist in substantial equilibrium.

The phase diagram for the system benzoic acid-water is well known, for example, see Findlay, The Phase Rule and Its Applications, page 175, 9th edition (1951), Dover Publications. This diagram shows the area on a plot of composition against temperature within which the system exists as two liquid phases in equilibrium; the heavy or organic phase being a solution of water in benzoic acid and the light or aqueous phase being a solution of benzoic acid in water. This area has temperature limits of about 94.6° C., the invariant point, and about 117.2° C., the critical solution temperature. The composition limits are about 6% to about 73% by weight of benzoic acid. It is within this two-phase area that the present process is operated.

Under these conditions, where there are present two aqueous benzoic acid phases in equilibrium, the oxidation by-products in the crude benzoic acid would be expected to distribute themselves between the two liquid phases according to their relative solubilities in water. To the contrary, however, it has been found that these impurities are almost completely excluded from the light phase and are found essentially entirely in the organic phase even through some of these by-products have water solubilities as great as or greater than benzoic acid itself. The aqueous phase obtained under these conditions is substantially a solution of pure benzoic acid and when it is separated and cooled, crystalline benzoic acid of exceptional purity is precipitated. Color and odor, as well as impurities, are also largely removed by this purification process and the benzoic acid product is essentially colorless and odorless.

Prior art processes employing water extraction of somewhat similar mixtures teach superior results when using superheated water under high pressure. Such processes necessarily require relatively large heat input and the use of pressure equipment, resulting in higher costs and increased complexity of operation. In the present process it has been discovered that best results are obtained by running the extraction step at 95–100° C., below the atmospheric boiling point of water, thereby making available all the advantages of operation under atmospheric or near-atmospheric pressure. When operating under these conditions, about 0.6–14 parts by weight of water per part of crude benzoic acid are employed, preferably about 0.7–7 parts of water. In selecting the proportion of water to be used within the above limits, the desirability of extracting a larger amount of benzoic acid with a relatively high proportion of water must be balanced against the smaller yield of higher purity benzoic acid obtained with a lower water ratio. Surprisingly, there is no build-up of impurity concentration in the filtrate obtained on separation of crystallized benzoic acid from the cooled aqueous extract, and the aqueous filtrate can be recycled to the extraction process without harmful effect on product quality. This is in contrast to conventional recrystallization of benzoic acid wherein the crude acid is completely dissolved in water and the impurities remain dissolved in the aqueous filtrate from the cooled solution. The organic layer from the extraction may be returned to the crude benzoic acid stream being used as feed for a phenol plant or other process or it may be partially recycled to the extraction process.

Alternatively, this process may be operated as a two-stage separation from a superheated water extraction. This mode of operation is based on the known fact that mixtures of certain proportions of benzoic acid and water exist in two liquid phases between 94.6° C., the invariant point, and 117.2° C., the critical solution temperature. Crude benzoic acid is contacted with about 0.7–7 parts by weight of water, preferably 0.8–5 parts, at about 110–117° C. under conditions such that substantial equilibrium is attained and two liquid phases are present. Superatmospheric pressure at least sufficient to maintain the water in the liquid state is necessary during this step. The lighter or aqueous layer is separated and cooled to about 95–100° C., whereupon this solution separates into a second aqueous layer and a second organic layer. Cooling the separated second aqueous layer to a temperature below 95° C., preferably to about 10–50° C., causes crystallization therefrom of essentially pure benzoic acid, substantially free of the original impurities. Under preferred operating conditions, this product when filtered and dried is of sufficient purity to be sold without further treatment as benzoic acid of the highest quality. The second organic layer ordinarily is also of better than 99 percent purity, thereby qualifying as a good technical grade of benzoic acid, and needs only separation, cooling, and drying for sale as such.

The first organic layer obtained in this mode of operation also retains nearly all of the original impurities, even though some of these impurities are as soluble in water as benzoic acid itself. This organic layer may be returned to the crude benzoic acid stream for conversion to phenol or it may be recycled in part to the purification process and contacted again with superheated water.

Therefore, in this way there are obtained purified benzoic acids of two different qualities whose total amount and relative proportions can be adjusted to fit commercial requirements by changing the quantity of water used and the temperatures at which the steps of the process are operated. The purity of each benzoic acid product may similarly be varied as required.

Thus, the first step may be carried out at a temperature from about 110° C. up to about 117° C., since liquid water and liquid benzoic acid become miscible in all proportions at 117.2° C. Preferably this first separation is brought about at 113–116° C. A relatively high temperature in this step makes possible the extraction of a larger quantity of benzoic acid from the crude organic layer and the separation of more purified benzoic acid in the second step. Conversely, lower temperatures produce purified benzoic acid less in amount but of somewhat higher quality. Similarly, the distribution of benzoic acid between the organic and aqueous layers formed in the second step of the process depends upon variation of the temperature limits of 95–100° C. in this step.

The water extraction step in either mode of running the process is carried out in the presence of sufficient turbulence or agitation to attain substantial equilibrium between the two liquid layers produced.

Examples 1–4 illustrate the results obtained by water extraction of crude benzoic acid at 95–100° C.

EXAMPLES 1–3

A crude benzoic acid product obtained by catalytic air oxidation of toluene was subjected to preliminary purification to remove catalyst residues, unreacted toluene, and the bulk of oxidation impurities. The resulting material was benzoic acid of 98.6 percent purity by gas chromatographic analysis. Portions of this product were mixed with different amounts of water calculated to give two-phase liquid systems at 99° C. having aqueous layer to benzoic acid layer weight ratios of 8.1/1, 21.1/1, and 47.8/1, respectively. These three mixtures were heated to 99° C. in steam-jacketed separatory funnels with occasional shaking. The heavy phases, containing about 70 percent benzoic acid, were separated and the light or aqueous phases were then rapidly cooled to 25° C. Crystalline benzoic acid precipitated from each and these products were separated by filtration, dried, and analyzed. The benzoic acid contained in the heavy phases was similarly separated and analyzed by gas chromatography. The results of these experiments are listed in Table 1. Impurities are given in parts per million.

As shown by the above data, smaller proportions of water yield, from the light phase, crystalline benzoic acid of significantly higher purity. Increasing the water ratio, while increasing correspondingly the quantity of benzoic acid extracted, produces acid from the light phase of lower quality. When the water is increased to a point where all the benzoic acid is dissolved and no heavy phase is present, i.e., a conventional recrystallization, the recrystallized acid obtained on cooling the solution is of even poorer quality.

EXAMPLE 4

A series of water extractions of crude benzoic acid was run at 99° C. as described in Examples 1–3 in which the filtrate obtained from the benzoic acid separation from the aqueous phase was the water used in the subsequent extraction. As shown in Table 2, the purity of the benzoic acid products was not adversely affected by this technique and there was no build-up of impurities in the water.

Table 2

| | Product percent benzoic acid | Mother liquor p.p.m. impurities |
|---|---|---|
| After first extraction | 99.7 | 50 |
| After second extraction | 99.8 | (¹) |
| After third extraction | 99.9 | (¹) |
| After fourth extraction | 99.8 | 50 |

¹ Not measured.

Example 5 illustrates batchwise operation of the process when carried out with a first phase separation at superheated water temperatures.

EXAMPLE 5

The impure benzoic acid used in this example was similar to that used in Examples 1–4. A stainless steel cylinder of 500 ml. capacity and equipped with a valve at each end was charged with 69 g. of impure benzoic acid and 261 g. of water and heated to 115° C. with occasional shaking. The lower organic layer amounting to 55.8 g. was drawn off and the upper aqueous layer was transferred to a separatory funnel and its temperature was adjusted to 99° C. A second separation into aqueous and organic liquid layers took place and the organic layer was drawn off. This second organic layer weighed 24.5 g. and it was found to be a solution of water in liquid benzoic acid containing 72.9 percent by weight of benzoic acid. The solid benzoic acid obtained by cooling and drying the second organic layer was of 99.5 percent purity. The second aqueous layer was cooled to about 25° C., thereby causing separation of pure white crystalline benzoic acid. The dried product weighed 14 g. and was of exceptional purity, assaying essentially 100 percent benzoic acid on a dry basis.

This process can also be operated in a continuous manner wherein the first step is a liquid-liquid countercurrent extraction carried out in a conventional extraction column or tower at the appropriate temperature. The design of the column and the feed rates of the crude benzoic acid and hot water are such that substantial equi- Table 1

| Impurity | Starting Material | Phase ratio 8.1/1 | | Phase ratio 22.1/1 | | Phase ratio 47.8/1 | |
|---|---|---|---|---|---|---|---|
| | | Lt. phase bz. acid | Hvy. phase bz. acid | Lt. phase bz. acid | Hvy. phase bz. acid | Lt. phase bz. acid | Hvy. phase bz. acid |
| Benzaldehyde | 70 | <50 | 280 | <50 | 420 | <50 | 380 |
| Benzyl esters | 190 | <75 | 250 | <75 | 350 | <75 | 430 |
| Benzyl alcohol | 800 | 20 | 960 | 20 | 1,680 | 20 | 2,210 |
| Aromatic Hydrocarbons | 12,150 | 280 | 18,700 | 710 | 31,500 | 1,280 | 50,860 |
| Unknowns | 950 | <55 | 1,280 | <60 | 2,210 | <90 | 3,610 |
| Total Impurities, percent | 1.4 | 0.05 | 2.15 | 0.09 | 3.62 | 0.15 | 5.75 | librium is reached in operation of the process and a stable interface between the liquid phases is maintained, otherwise the conditions of the process are as set forth previously. The molten benzoic acid stream is introduced at or near the top of the extraction column and the extracted raffinate is continuously drawn off from the bottom of the column whence it may be recycled to the extraction process or returned to the main phenol process feed stream. Hot water is fed in near the bottom of the column and the aqueous extract flows continuously from an outlet near the top. Where the extraction is run at 95–100° C., the aqueous extract is piped to a crystallizer wherein it is cooled and the resulting slurry is transferred to filtration means. Where the extraction is accomplished at 110–117° C., the aqueous extract flows continuously from an outlet near the top to a separator wherein the second stage of the process is operated at 95–100° C. and whence the second aqueous layer and the second organic layer are separated and worked up as previously described. The aqueous filtrate from the final crystallization of benzoic acid in either mode of operation is advantageously recycled to the extraction column. The above description of continuous operation of the process is general in nature and minor variations in operating techniques conventional in the continuous extraction art may be introduced as desired to fit individual situations. For example, the extraction tower or column may be replaced by a series of interconnected vessels serving as combined mixing and settling tanks operating at the same or different temperatures, wherein there is countercurrent flow of the aqueous and organic layers, thereby accomplishing the same results obtained from the extraction in an extraction column as described above. Such multistage extraction can be designed to fit various purity and yield requirements, whatever form the extraction apparatus takes.

Other conventional variations can be introduced into the purification process, for example, solvent extraction of the aqueous extract to reduce further the impurity content.

I claim:
1. A process for purifying crude benzoic acid obtained by the catalytic oxidation of toluene with an oxygen-containing gas, which process comprises contacting said crude benzoic acid in the molten state with 0.6–14 parts by weight of water per part of crude benzoic acid at a temperature of about 95° C. to about 117° C., thereby forming two liquid benzoic acid-containing phases in substantial equilibrium, said liquid phases consisting of a light aqueous phase and a heavy organic phase, separating said phases, cooling said aqueous phase, thereby causing precipitation therefrom of purified benzoic acid, and separating said purified benzoic acid.

2. The process of claim 1 wherein the crude benzoic acid is continuously contacted with water in a countercurrent extraction column.

3. A process for purifying crude benzoic acid obtained by the catalytic oxidation of toluene with an oxygen-containing gas, which process comprises contacting said crude benzoic acid in the molten state at 95–100° C. with about 0.6–14 parts by weight of water, thereby forming two liquid phases in substantial equilibrium, said phases consisting of a light aqueous phase and a heavy organic phase, separating said phases, cooling said aqueous phase to a temperature below 94.6° C., thereby causing precipitation therefrom of purified benzoic acid, and separating said purified benzoic acid.

4. The process of claim 3 wherein 0.7–7 parts by weight of water are employed per part of crude benzoic acid.

5. The process of claim 3 wherein the crude benzoic acid is continuously contacted with water in a countercurrent extraction column.

6. A process for purifying crude benzoic acid obtained by the catalytic oxidation of toluene with an oxygen-containing gas, which process comprises contacting said benzoic acid in the molten state with about 0.7 to about 7 parts by weight of water at about 110° C. to about 117° C. in an extraction zone under sufficient pressure to maintain the water in the liquid state, thereby forming two liquid phases in substantial equilibrium, said phases consisting of a first aqueous phase and a first organic phase, separating said phases, cooling said first aqueous phase to a temperature of about 95° C. to about 100° C., thereby causing the formation of two liquid phases consisting of a second aqueous phase and a second organic phase, separating said second phases, and cooling said second aqueous phase to a temperature below 94.6° C., thereby causing crystallization therefrom of benzoic acid.

7. The process of claim 6 wherein 0.8–5 parts of water are employed per part of benzoic acid.

8. The process of claim 6 wherein the crude benzoic acid is continuously contacted with water in a countercurrent extraction column.

References Cited by the Examiner

UNITED STATES PATENTS

| 2,189,726 | 2/1940 | Conover | 260—525 |
| 2,252,117 | 8/1941 | Conover | 260—525 |
| 2,572,575 | 10/1951 | Shafer et al. | 260—525 |
| 2,963,509 | 12/1960 | Barker et al. | 260—524 |

FOREIGN PATENTS 768,273  2/1951  Great Britain.

OTHER REFERENCES

Handbook of Chemistry and Physics, pp. 750–1, 772–3, and 788–9 (35th ed., 1953–4).

LORRAINE A. WEINBERGER, *Primary Examiner.*

LEON ZITVER, *Examiner.*